Nov. 5, 1968    V. E. BOLEN    3,408,753
SHOE AND METHOD OF MAKING THE SAME
Filed Aug. 10, 1966    2 Sheets-Sheet 1

INVENTOR.
VERNE E. BOLEN
BY

Nov. 5, 1968  V. E. BOLEN  3,408,753
SHOE AND METHOD OF MAKING THE SAME
Filed Aug. 10, 1966  2 Sheets-Sheet 2

INVENTOR.
VERNE E. BOLEN
BY

United States Patent Office 3,408,753
Patented Nov. 5, 1968

3,408,753
SHOE AND METHOD OF MAKING THE SAME
Verne E. Bolen, Springfield, Tenn., assignor to Genesco, Inc., Nashville, Tenn., a corporation of Tennessee
Filed Aug. 10, 1966, Ser. No. 571,451
14 Claims. (Cl. 36—2.5)

This invention relates to the manufacture of shoes and particularly to the manner of assembling shoe components on a last and connecting the various components with each other.

In the manufacture of shoes wherein the outsole is cemented to the upper and the insole, and according to some processes wherein the outsole is otherwise connected to the upper by stitching, it is customary to tack the insole to the bottom, or plantar portion, of the last and thereafter to pull the margin of the upper, called the lasting allowance, over the margins of the last bottom where it is fastened to the insole. One of the purposes of the insole is to hold the upper in properly aligned position while lasting operation does not always result in a uniform product since slight misalignment of the insole with the last or other shoe components may result in misalignment with the other parts of the shoe.

This invention comprehends utilizing all types of outsole assemblies that may be cemented, or otherwise attached, to the shoe bottom, including leather, finished crepe, and the various plastic materials including those that are thermoplastic, thermo-setting, vulcanizable, and the like. The instant invention further comprehends a method of precision shoe manufacture, wherein the insole and outsole assemblies are pre-sized and finished prior to attachment to the shoe. The method of shoe manufacture set forth herein specifically includes and relates to a method of attaching the insole, sole portion, heel, and shank stiffener to the shoe, without the use of tacks for alignment purposes. The invention, therefore, has for one of its objects the elimination of many of the previous operations involved in shoe manufacture as heretofore practiced.

Another object of this invention is to provide a method by which the insole may be attached in proper aligned relationship to a last at the start of the shoe construction.

Another object of this invention is to provide a method by which an outsole assembly may be accurately aligned with the lasted upper of the shoe prior to its permanent attachment thereto.

Still a further object of this invention is to provide a method of sole construction including a method of mating a sole portion with a heel so as to provide a precision outsole assembly that may be cemented as a unitary structure to the completed upper shoe portion.

These and other objects of the invention, which will appear as the description proceeds, are accomplished by providing the last, the insole, and the outsole assembly with alignment means which cooperate in a manner permitting rapid and precise assembly of the various shoe components during the manufacture of the shoe, and accordingly, avoids the necessity of tacking as was heretofore practiced. The invention further contemplates providing the various components that make up a sole assembly with portions that are keyed in a manner to enable the outsole assembly to be pre-fabricated into a single or complete unit prior to assembly with the lasted upper and insole.

Figure 1:
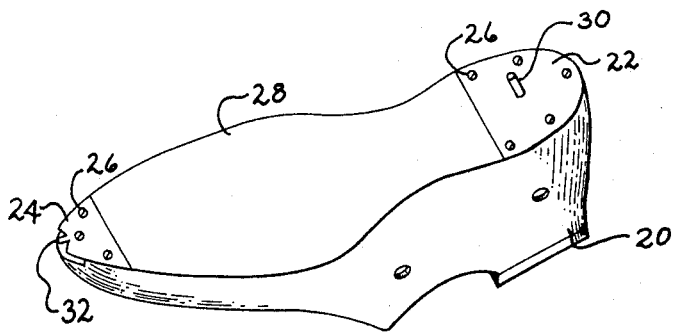
FIGURE 1 is a bottom-up perspective view of a last used in and for the execution of the method of manufacture according to a preferred embodiment of the instant invention.

Looking now to the details of the various figures in the drawings, there is seen in FIGURE 1 a last preferably fabricated from wood, and having a metal heel plate 22 and a metal toe plate 24 attached at each extremity thereof by screws or the like as generally indicated by the numeral 26. The plantar portion 28 of the last together with the heel and toe plates 22 and 24 respectively, lie in a generally contoured surface which is contrageneric to the general configuration of the completed foot receiving side of the insole. Attached to the heel portion of the form and projecting from the heel plate is a stud 30, preferably in the form of a rounded rod or the like. The forward end of the toe plate is notched as generally indicated by the numeral 32 to provide a tongue or protuberance 34 that is defined by suitable cutouts 36 and 36' (FIGURE 6).

Figure 2:
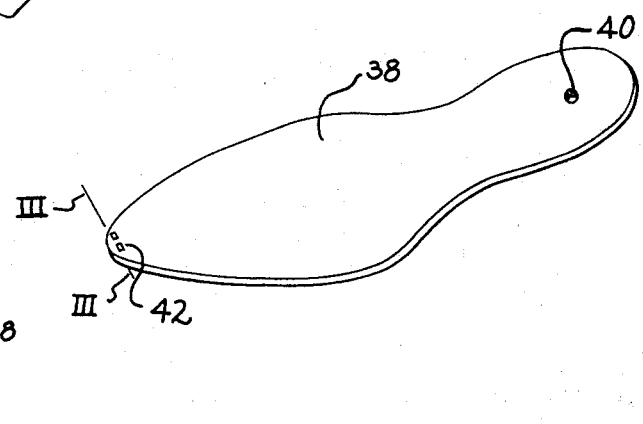
FIGURE 2 is a bottom-up perspective view showing an insole before it has been placed upon the last of FIGURE 1.
Figure 3:
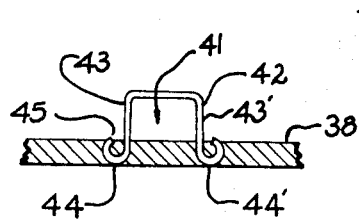
FIGURE 3 is an enlarged fragmentary sectional view taken along line III—III of FIGURE 2, with the insole turned bottom-down.

Looking now to FIGURE 2, there is seen an insole 38 having an aperture 40 through the heel portion thereof and a staple 42 at the toe portion thereof. The staple is bent over or braded and has free ends suitably anchored in the insole piece. As seen in FIGURE 3, the staple 42 has legs 43 and 43' whose ends 44 and 44' are braded or turned back into the insole 38 so that the free end portions 45 are addressed away from the foot side and well up in the tip of the insole 38, where the bridge of the staple cannot possibly contact the foot of the person wearing the shoe.

Figure 5:
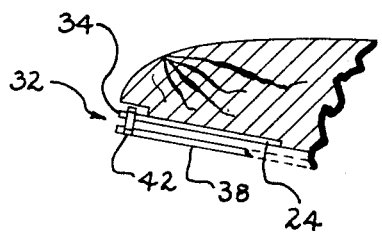
FIGURE 5 is a fragmentary sectional view taken longitudinally of FIGURE 4, which has been turned bottom-down, and showing the toe area thereof.
Figure 6:
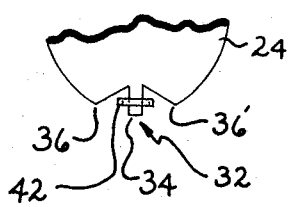
FIGURE 6 is a fragmentary plan view of a toe plate, shown in FIGURE 1, in association with a staple shown in FIGURES 2 and 3.

The bridge portion of the staple is spaced away from the insole so as to provide a U-shaped loop or free space 41 that may receive the projection 34 in a manner that is generally indicated in FIGURES 5 and 6.

Figure 4:
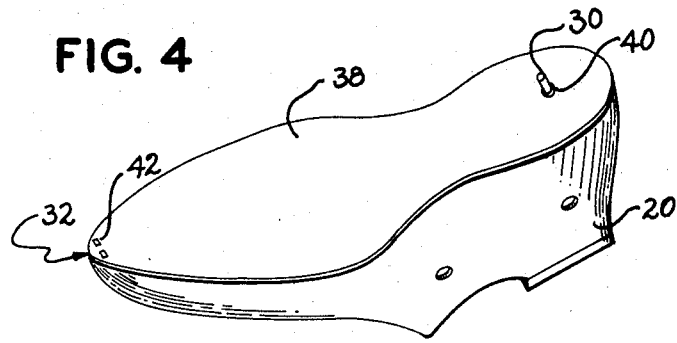
FIGURE 4 is a bottom-up perspective view showing the insole of FIGURES 2 and 3 placed in a predetermined and precisely aligned manner upon the last of FIGURE 1.

The insole 38 of FIGURE 2 is placed upon the last 20 of FIGURE 1 with the hole 40 in aligned relationship with and received by the upstanding stud 30. The depending U-shaped portion of the staple 42 that defines space 41 receives the tongue 34 with each leg of the staple being received by the notches formed by the cutouts 36 and 36' so as to cooperate together all in a manner as illustrated in FIGURES 4 through 6. The upper 46 of the shoe is applied to the last 20 and pulled into position such that lasting allowance 48 is inturned over the insole 38 to provide the assembled upper shoe parts of FIGURE 7.

Figure 7:
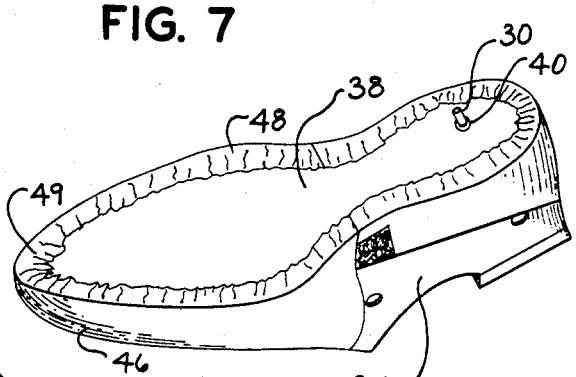
FIGURE 7 is a perspective view showing the last and insole of FIGURE 4 with the upper in over-lasted condition.

As now seen in FIGURE 7, the lasted upper 46 is suitably arranged upon the last 20 with the insole 38 having the aperture 40 received about the up-standing stud 30, and the staple 42 hidden under the over-lasted portion 49 of the upper. The over-lasted portion of the upper is then "roughed" or buffed at 48 so as to minimize the wrinkles and enhance the bond when the outsole assembly is later cemented into place upon the lasted shoe bottom of FIGURE 7. The components of FIGURE 7 are referred to as "the assembled upper shoe parts."

Figure 8:
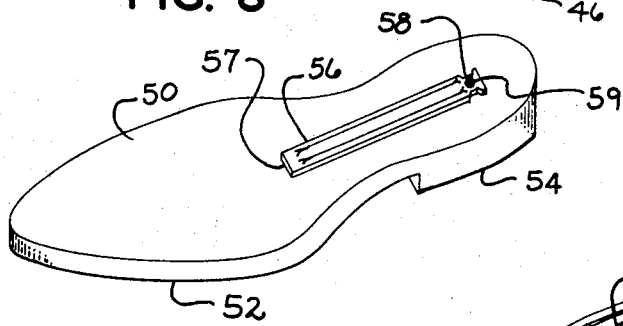
FIGURE 8 is a perspective view of an outsole assembly adapted to be received upon the lasted shoe of FIGURE 7.
Figure 13:
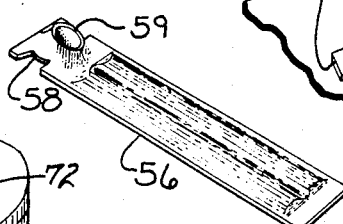
FIGURE 13 is a perspective view of a shank stiffener useable in accordance with the present invention to provide the outsole assembly of FIGURES 8, 9, and 12.
Figure 11:
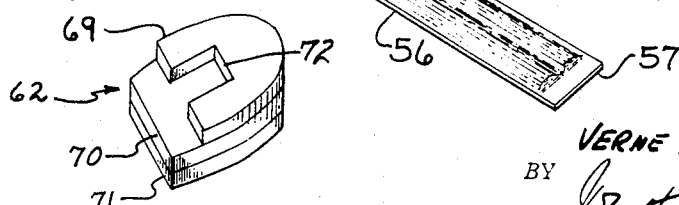
FIGURE 11 is a perspective view of a shoe heel that may be used in conjunction with the sole portion of FIGURE 10 in the fabrication of the shoe outsole assembly of FIGURE 9.

Looking now to FIGURE 8, there is seen a molded sole 50 having a bottom or ground engaging portion that includes an out-sole portion 52 and a heel portion 54 suitably integrated to form an assembly that will hereinafter be referred to as an "outsole assembly." The outsole assembly of FIGURE 8 may be built up on a combination of leather and synthetics, or alternatively, may be molded in its entirety from any synthetic including thermo-plastic, thermo-setting and vulcanizable natural or synthetic materials. A shank stiffener 56, preferably of spring steel and of an elongated configuration, is glued or cemented at end 57 and is apertured at the opposite end 59. As seen in FIGURE 13, the aperture is countersunk to form a drawn eyelet which leaves a substantial amount of metal depending therefrom which enables the drawn eyelet to cooperate in aligned relationship with a preformed aligned hole that has been previously provided in the upper or foot side of the heel portion. The aligned hole in the heel portion provides an indexed relationship with the drawn eyelet, and the aperture of the drawn eyelet provides an indexed relationship with the remaining shoe components. Alternatively, since the dranw eyelet provides an aperture defined by sharp edges thereon, it may be suitably aligned with and pressed into the material of the unitized outsole assembly at the heel portion, where it will remain in indexed relation thereto. The longitudinal edges of the shank may be provided with down-turned sharp edges at 58, if desired, which will dig into the foot side of the sole material to provide additional anchoring means for securing the steel shank stiffener to the outsole assembly.

Figure 10:
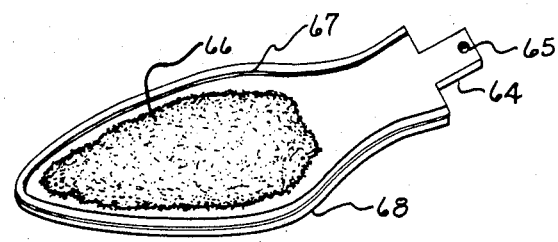
FIGURE 10 is a perspective view of a sole portion that may be used in accordance with the present invention and in the manufacture of the completed outsole assembly of FIGURE 9.
Figure 9:
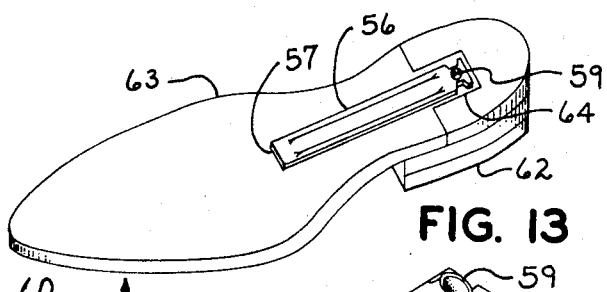
FIGURE 9 is a perspective view of a finished outsole assembly including the sole portion and heel portion that may likewise be used in conjunction with the lasted shoe of FIGURE 7 so as to form the completed shoe.
Figure 12:
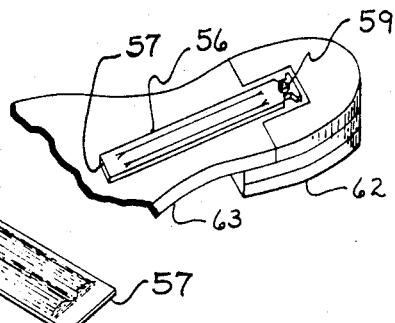
FIGURE 12 is another perspective view showing the completed sole of FIGURES 10 and 11.

Looking now to the details of FIGURE 9 in conjunction with the remaining figures, there is seen indicated generally by numeral 60 a completed outsole assembly comprised of a sole portion 63 and a heel assembly 62 that is fabricated in accordance with this invention. The heel portion 62 and the sole portion 63 are provided with keyed parts which enable them to be mated together in properly aligned relationship. The sole portion 63 is provided with a heel locating tenon 64 at the heel portion of the outsole. The heel locating tongue is preferably apertured as at 65 so as to receive the before mentioned drawn eyelet 59 of the shank. The heel 62 includes a mortise 72 in portion 69 of the heel base 70 so as to receive the heel locating tenon 64 of the sole portion 68 in an aligned manner that accordingly permits precision preformed heel and outsole parts to be mated in accordance with FIGURE 12. The resulting structure is a prefinished unitized lower shoe or outsole assembly, such as seen at 60 in FIGURE 9. The unitized outsole assembly is adapted to be cemented directly onto the prefinished precision made upper shoe components by suitably bonding the two faces together. As seen in FIGURE 12, a shank stiffener may be aligned with the aperture 65 of FIGURE 10 by merely aligning the drawn eyelet of the shank therewith after which the forwardly extending part may be secured to the foot side of the outsole so as to enable the completed lower shoe portion 60, as seen at FIGURE 9, to be handled with no misalignment problems resulting thereto. The unitized lower shoe portion 60 is next mated with the before mentioned assembled upper shoe parts of FIGURE 7 by aligning the aperture of the drawn eyelet 59 with the up-standing shank or pin 30 so as to allow the unitized lower shoe portion 60 to be suitably keyed in aligned relationship to the upper shoe portion of FIGURE 7, prior to the cementing step.

The sole is optionally provided with bottom filler 66 and a welt 67. The welt may be in the form of a strip of leather suitably stretched or cemented into place about the outer margin of the sole and generally spaced from the bottom filler 66 at the forward portion 68 of the sole piece.

The embodiment of FIGURES 9 through 12 offers a method by which sole leather may be greatly conserved since it enables the manufacturer to prefinish the sole portion before it is attached to the shoe. In carrying out the invention, the following sequence of operations have been found satisfactory, although variations will occur to those skilled in the art which will produce essentially the same prefinished sole by essentially the same process while at the same time gaining all the beneficial results flowing from the present novel shoe manufacture. Preferably, the components of the outsole assembly are die cut to within approximately one thirty-second inch of the desired finished size, including the cutting of the tenon and the heel portion of the outsole proper. The tenon later serves as a locating key for proper and precision positioning of the mortise heel. The formation of aperture 65, which serves as a locating hole for the shank stiffener, may be carried out in this same operation, if desired. The welt is next cemented to the sole portion, preferably by machine, should a welt be desired, and the outsole and welt are trimmed to the exact size on automatic edge trimming equipment. The outsole is edge-set with the welt attached on an automatic inker and edge-setter and the bottom filler cemented to the outsole. The shank is next attached to the foot side of the sole by inserting the drawn eyelet into the previously formed locating hole, the opposite end of the shank secured to the outsole with the forepart of the shank preferably secured thereto with cement. The outsole is now finished and ready for attachment to the lasted shoe upper, and since the outsole assembly has been pretrimmed and prefinished, accurate assembly by the remaining step may be accomplished in the sole laying operation by using the same locating pins in the heel section of the form that was previously used for alignment of the prefinished insole. The drawn eyelet of the shank, that is now properly indexed with respect to the lower portions of the shoe, is located on or received by the up-standing stud 30 quickly and efficiently, merely by holding the sole in the correctly aligned position lengthwise of the foot-form while at the same time centering the toe portion of the sole by feel and eye before cementing in the sole layer.

The before described method of shoe making, wherein the components of insole, sole portion, shank, and heel can be prefinished, greatly improves the appearance of the shoe since the disclosed method of manufacture provides a precision made shoe that accordingly results in a design of maximum comfort and appearance and additionally eliminates much af the abuse generally associated with handling the lasted shoe as in the prior art. The accurate and positive location during assembly of the various shoe components wherein the various portions such as the heel, sole portion, and insole that are prefabricated by die cut or molding greatly facilitates the production of the disclosed improved shoe.

The provision of an alignment pin at the heel and the slotted toe plate permits the insole to be held in place with respect to the last without the use of tacks or other securing means as is presently practiced in the art. When the shoe is complete, the last may be removed without first removing the usual temporary tacks. The accurate alignment of the insole with the last, the accurate alignment of the sole components with each other and with the upper shoe components, the absence of tacks inadvertently being left in the shoe, and the improved precision of assembly along with the reduction in cost of manufacture are the outstanding advantages that flow from the present shoe manufacture. The staple that remains in the insole is a small harmless loop that remains well up in the tip of the shoe and away from the foot, and is of no further consequence in the completed shoe.

In the present illustrative embodiments, the sole extension beyond the upper, and the welt strip cemented to the outsole provides a brogue appearance considered desirable in a man's shoe. In addition, the welt strip around the sole portion contributes to imparting a saucer shape to the top surface of the outsole. This type of structure contains the upper and presents a close fitting joint of the upper to the sole assembly. Other methods of achieving this finished appearance may be employed including reducing the thickness of the outsole in the center portion, and the like, although such an alternate method may prove less satisfactory and less economical, while staying within the spirit of my invention.

Moreover the invention makes possible greatly increased last life. The avoidance of tacking eliminates the most common cause for last repair and replacement.

While the process and operations and the specific shoe structure resulting therefrom and described above relate primarily to shoes that are made to simulate a welted construction, it will occur to those skilled in the art that the process is not limited to such a construction and that the method of locating the sole portion and heel can be applied to prefinished crepe, synthetic, or leather soles where the heel has been previously attached before the sole laying operation. Furthermore, while the shoe construction employed here is a cement construction, it will occur to those skilled in the art that the outsole may be extruded plastic which is attached in situ to the lasted shoe upper while still staying within the confines of applicant's novel shoe manufacture.

Having thus described the invention, what is claimed and desired to be secured by Letters Patent is:

1. A method of making shoes or the like comprising the steps of: providing a last with alignment means on the plantar portion thereof; prefabricating an insole to the exact size desired to fit the shoe, including providing alignment means on the insole adapted to engage said alignment means on the last to thereby permit alignment of said insole with said last when the former is superimposed upon the latter; placing said insole on said last in accordance with the last recited step; placing an upper about the last and securing the over-lasted lasting allowance to the insole to provide a lasted assembled upper shoe part; and attaching an outsole assembly in properly aligned relationship to the bottom portion of the assembled upper shoe parts, said alignment means provided on the last includes a stud at the heel portion and a protuberance at the toe portion; the alignment means provided on said insole includes an apertured heel portion and a looped wire at the toe portion; whereby the apertured heel portion is received about the stud and the looped wire is received about the protuberance to provide precise alignment with the insole with respect to the last.

2. The method of claim 1 and further including the steps of: providing the outsole assembly with an alignment means in the form of an apertured heel portion; and aligning said apertured heel portion with said stud to thereby provide precise alignment between said assembled upper shoe parts and the outsole assembly.

3. A method of making shoes or the like comprising the steps of: providing a last with alignment means on the plantar portion thereof; prefabricating an insole to the exact size desired to fit the shoe, including providing alignment means on the insole adapted to engage said alignment means on the last to thereby permit alignment of said insole with said last when the former is superimposed upon the latter; placing said insole on said last in accordance with the last recited step; placing an upper about the last and securing the over-lasted lasting allowance to the insole to provide a lasted assembled upper shoe part; and attaching an outsole assembly in proper aligned relationship to the bottom portion of the assembled upper shoe parts, said alignment means on the last including a stud at the heel portion that is adapted to engage an aperture provided on the heel portion of the insole; said alignment means further including providing a tongue at the toe portion of the last that is adapted to engage a loop provided on the toe portion of the insole; whereby the insole and last are held in precise aligned relationship with respect to each other when properly assembled.

4. The method of claim 3, and further including the steps of: aperturing the heel portion of the outsole assembly to provide precise alignment between said outsole assembly and the assembled upper shoe parts when the outsole assembly is superimposed upon the bottom of the assembled upper in the following sole laying step; and laying the outsole assembly onto the upper by applying cement therebetween.

5. A method of making shoes or the like comprising the steps of: providing a last with alignment means on the plantar portion thereof; prefabricating an insole to the exact size desired to fit the shoe, including providing alignment means on the insole adapted to engage said alignment means on the last to thereby permit alignment of said insole with said last when the former is superimposed upon the latter; placing said insole on said last in accordance with the last recited step; placing an upper about the last and securing the over-lasted lasting allowance to the insole to provide a lasted assembled upper shoe part; and attaching an outsole assembly in properly aligned relationship to the bottom portion of the assembled upper shoe parts; and further providing the outsole assembly with alignment means in the form of an apertured heel portion that is adapted to cooperate with the alignment means of the last; and aligning said apertured heel portion with said alignment means of the last prior to attaching the outsole assembly to the assembled upper shoe parts.

6. The method of shoe manufacture defined in claim 5, and further including the steps of: providing the outsole assembly with a shank stiffener having a drawn eyelet in one end thereof; aligning the drawn portion of the eyelet within the apertured heel portion of the outsole assembly; and aligning the apertured heel of the outsole assembly in the described manner set forth in claim 5, wherein the apertured heel portion includes the eyelet portion of the added shank stiffener.

7. The method of making a prefabricated outsole assembly for a shoe comprising the steps of: prefabricating a sole portion and a heel portion; providing the sole portion with a rearwardly projecting tenon; providing the heel portion with a mortise that is adapted to mate with the tendon of the preceding step; and attaching the sole portion to the heel portion to provide a prefabricated finished outsole assembly.

8. The method of claim 7, and further including the steps of: providing an aperture in the sole portion prior to assembly with the heel portion; cementing a welt about the outer marginal edges of the sole portion; cementing a filler onto the central portion of the sole portion; providing an elongated shank stiffener with a drawn eyelet at one end thereof; aligning the drawn portion of the eyelet of the shank stiffener with the aperture of the sole portion after attaching the heel portion to the sole;

cementing the remaining end of the shank to the sole portion; and aligning the apertured shank stiffener with an assembled upper shoe part to provide a completed shoe.

9. A shoe comprising an assembled upper portion adapted to be attached to an outsole assembly, wherein said upper portion is suitably mounted on a form during assembly thereof; said upper portion including an insole and the over-turned lasting allowance of an upper; said insole having means forming an aperture at the heel portion and alignment means adapted to cooperate with means associated with the heel and toe portions of the form; whereby said insole may be readily positioned on said form in precise alignment with the remaining shoe parts; an outsole assembly including a shank stiffener having an aperture defined by a drawn eyelet; said aperture of the shank stiffener adapted to be received by said means associated with the heel portion of said shoe to thereby provide an aligned relationship between said assembled upper and said outsole assembly; whereby said outsole assembly may be suitably aligned with said heel portion of said form to thereby provide a precise aligned shoe.

10. The shoe of claim 9 wherein: said outsole assembly of said shoe includes a sole portion and a heel; said sole portion having a depending tongue; said heel having means forming a cut-out opposite in configuration to said tongue; whereby said sole portion of the outsole and said heel may be individually prefabricated followed by assembly wherein the cutout receives the tongue in precise aligned relationship to provide a precision made outsole assembly for said shoe.

11. In a shoe having an insole to which is secured the lasted upper portion of the shoe, and an outsole assembly cemented into position upon the lasted upper shoe portion, said insole including alignment means at the heel portion and the toe portion to cooperate with alignment means on a last; said insole adapted to be attached to the last with the first and second recited alignment means cooperating in aligned relationship; said outsole assembly having alignment means at the heel portion adapted to cooperate with the before mentioned alignment means at the heel portion of the last to permit said outsole assembly to be superimposed upon said lasted upper portion in proper aligned relationship therewith; whereby said outsole assembly may be attached in completed ofrm to the finished lasted upper shoe portion in precise aligned relation thereto.

12. The shoe of claim 11 wherein said outsole assembly is provided with a shank stiffener having a drawn outlet at one end thereof; said shank stiffener adapted to be positioned upon said outsole so as to place the eyelet in an aligned position on the heel portion of the outsole assembly that enables the aperture to be received by the alignment means associated with the heel area of the last; whereby said outsole assembly and said lasted upper portion of the shoe may be mated in properly aligned relationship.

13. The shoe of claim 11 wherein said outsole assembly includes means forming an aperture at the heel portion that corresponds to the relative position of the alignment means of the heel portion of the last; means providing said outsole with a shank stiffener having a drawn eyelet therein; said drawn eyelet being received by said aperture in said heel portion of said outsole assembly; whereby said eyelet may be aligned with said alignment means in the heel portion of the shoe last.

14. The insole for a shoe, said insole having a tip portion and a heel portion, a staple in the tip portion of the insole, said staple having a bridge in spaced relation to the foot side of the insole, and said heel portion having an aperture therein.

References Cited
UNITED STATES PATENTS

| | | | |
|---|---|---|---|
| 1,289,711 | 12/1918 | Ettle et al. | 36—31 |
| 3,144,669 | 8/1964 | Lamy | 12—14 |
| 3,226,851 | 1/1966 | Marcy | 36—32 |
| 3,302,313 | 2/1967 | Isaacson | 12—141 |

PATRICK D. LAWSON, *Primary Examiner.*

UNITED STATES PATENT OFFICE
CERTIFICATE OF CORRECTION

Patent No. 3,408,753                                    November 5, 1968

Verne E. Bolen

It is certified that error appears in the above identified patent and that said Letters Patent are hereby corrected as shown below:

Column 1, line 20, after "while" insert -- succeeding operations are performed. The customary --; line 54, "tion" should read -- ture --. Column 3, line 26, "on" should read -- of --; line 43, "dranw" should read -- drawn --. Column 4, line 34, after "mortise" insert -- in the --; line 67, "af" should read -- of --. Column 8, line 6, "ofrm" should read -- form --.

Signed and sealed this 10th day of March 1970.

(SEAL)
Attest:

Edward M. Fletcher, Jr.                              WILLIAM E. SCHUYLER, JR.
Attesting Officer                                       Commissioner of Patents